United States Patent
Maltinsky

(10) Patent No.: US 12,425,318 B2
(45) Date of Patent: Sep. 23, 2025

(54) DETECTING AND ALERTING ON DNS RELATED RISK OF DATA TAMPERING

(71) Applicant: BGPROTECT LTD, Raanana (IL)

(72) Inventor: Alexander Maltinsky, Jerusalem (IL)

(73) Assignee: BGPROTECT LTD, Raanana (IL)

(*) Notice: Subject to any disclaimer, the term of this patent is extended or adjusted under 35 U.S.C. 154(b) by 4 days.

(21) Appl. No.: 18/573,046

(22) PCT Filed: Jun. 22, 2022

(86) PCT No.: PCT/IL2022/050673
§ 371 (c)(1),
(2) Date: Dec. 21, 2023

(87) PCT Pub. No.: WO2023/275860
PCT Pub. Date: Jan. 5, 2023

(65) Prior Publication Data
US 2024/0297837 A1   Sep. 5, 2024

Related U.S. Application Data

(60) Provisional application No. 63/216,643, filed on Jun. 30, 2021.

(51) Int. Cl.
*H04L 43/0823*   (2022.01)
*H04L 9/40*      (2022.01)
*H04L 61/4511*   (2022.01)

(52) U.S. Cl.
CPC ...... *H04L 43/0823* (2013.01); *H04L 61/4511* (2022.05); *H04L 63/1416* (2013.01)

(58) Field of Classification Search
CPC ............ H04L 43/0823; H04L 61/4511; H04L 63/1416
See application file for complete search history.

(56) References Cited

U.S. PATENT DOCUMENTS

2007/0083670 A1   4/2007  Kelley et al.
2012/0124087 A1*  5/2012  Malan ............... H04L 63/1441
                                              707/E17.014

(Continued)

OTHER PUBLICATIONS

Kuher et al.. "Going wild: Large-scale classification of open DNS resolvers", IMC 2015, DOI: http://dx.doi.org/10.1145.2815675.2815683 (Year: 2015).*

(Continued)

*Primary Examiner* — Minh Chau Nguyen
(74) *Attorney, Agent, or Firm* — The Roy Gross Law Firm, LLC; Roy Gross

(57) ABSTRACT

Disclosed is a method for alerting on incorrect DNS records returned by DNS servers over the internet and related to data transfer associated with given one or more hosts. The method comprising the steps of: I. acquiring a reference association list comprising an association between a query list comprising DNS queries for corresponding DNS records related to said data transfer, and expected query response per each query in the query list. II. Acquiring a DNS server list comprising identifications of as many deemed reliable DNS servers as possible over the internet that may affect said data transfer; III. Scrutinizing the DNS servers in the list by repeatedly sending them the queries included in the query list. IV. Comparing each query response with the expected results so as to detect incorrectly responding DNS servers. V. Issuing an alert upon detecting an incorrectly responding DNS server.

6 Claims, 2 Drawing Sheets

(56) References Cited

U.S. PATENT DOCUMENTS

| | | |
|---|---|---|
| 2016/0306965 A1* | 10/2016 | Iyer .................. G06Q 10/0635 |
| 2017/0374017 A1 | 12/2017 | Gautam |
| 2020/0106790 A1 | 4/2020 | Bagnall et al. |
| 2020/0341966 A1 | 10/2020 | Stoecklin et al. |
| 2021/0248624 A1* | 8/2021 | Keren .................. G06Q 50/184 |

OTHER PUBLICATIONS

Kuher et al; "Going wild: Large-scale classification of open DNS resolvers." Proceedings of the 2015 Internet Measurement Conference; 2015; DOI: http://dx.doi.org/10.1145/2815675.2815683.

PCT International Search Report for International Application No. PCT/IL2022/050673, mailed Sep. 21, 2022, 3pp.

PCT Written Opinion for International Application No. PCT/IL2022/050673, mailed Sep. 21, 2022, 6pp.

* cited by examiner

DETECTING AND ALERTING ON DNS RELATED RISK OF DATA TAMPERING

This application is a National Phase of PCT Patent Application No. PCT/IL2022/050673 having International filing date of Jun. 22, 2022, which claims the benefit of priority of U.S. Provisional Patent Application No. 63/216,643, filed Jun. 30, 2021, the contents of which are all incorporated herein by reference in their entirety.

FIELD OF THE INVENTION

The present invention relates generally to internet security, and more particularly to methods and systems for detecting and alerting on Domain Name System (DNS) related risk of tampering with internet data transfer.

BACKGROUND OF THE INVENTION

Domain name system (DNS) servers are used in the internet to translate domain names into various attributes related to hosts over the internet such as internet protocol (IP) addresses. One problem related to the DNS server system is that hackers may fraudulently change records returned thereby. For example, by changing the IP address associated with a domain name, a hacker can redirect internet traffic from a legitimate website to a phony website, even if the proper domain name is used. The phony website can then be used for various kinds of malicious activity such as: man-in-the-middle type attacks, credential theft, and spreading malware.

A common means of coping with the above problem is Domain Name System Security Extensions (DNSSEC), which is a suite of extension specifications for securing DNS related data exchanged in IP networks. However, internet users cannot be confident that responses to their DNS queries are always being DNSSEC verified.

In U.S. patent application Ser. No. 20070083670 internet user's computer stores domain names and corresponding IP addresses of all websites visited with the computer. Each time a website is accessed, the IP address received from the DNS server is compared to the IP address stored in the database. If the IP addresses are identical, then the newly received IP address is likely legitimate. If the IP addresses are different, then the newly received IP address is likely fraudulent, and the user can be warned before loading the website.

In U.S. patent application Ser. No. 20200341966, a DNS data collector that can be either part of a local network or part of an external network is implemented. The DNS data collector receives and collects logs from DNS transactions collected from various sources that include DNS resolvers, DNS servers, and DNS aggregator, which can be part of a local network or can be part of an external network. The DNS data collector determines if the DNS logs are missing any data related to the DNS transactions. The missing DNS data is looked up and the DNS logs are completed. Completed DNS logs can then be sent for analysis, such as for DNS traffic threats.

However, in the above references, as well as in the known art, missing is a solution for internet-global detection of false DNS records that may constitute a threat to data transfer associated with given one or a plurality of hosts.

SUMMARY OF THE INVENTION

Accordingly, it is a principal object of the present invention to provide a method for alerting on incorrect DNS records returned by DNS servers over the internet and related to data transfer associated with given one or more hosts. Thus, in accordance with an embodiment of the present invention, the disclosed method comprises the following steps:

I. acquiring a reference association list comprising an association between:
   (a) a query list comprising, per each of the given one or more hosts, one or more DNS queries for corresponding DNS records related to said data transfer, and
   (b) one or more expected query responses per each query in the query list;
II. acquiring a DNS server list comprising identifications of as many deemed reliable DNS servers as possible over the internet that may affect said data transfer;
III. scrutinizing the DNS servers in the DNS server list by repeatedly sending to each of them each of the queries included in the query list;
IV. comparing each query response obtained while scrutinizing the DNS servers with its expected query response included in the reference association list so as to detect incorrectly responding DNS servers; and
V. issuing an alert upon detecting an incorrectly responding DNS server, the alert comprising the identification of the incorrectly responding DNS server and information about the incorrect query response thereof.

In some embodiments, acquiring the DNS server list comprises the steps of:

I. Attempting to address as many DNS servers over the internet as possible with one or more test DNS queries sent to each of them, by covering the entire reachable IPV4 address space with the queries' destination addresses.
II. Including in the DNS server list identifications of at least part of the DNS servers that responded correctly to said test DNS queries.

In some embodiments, acquiring the DNS server list comprises the steps of:

I. Attempting to address as many as possible DNS servers located in a predetermined geographical area with one or more test DNS queries sent to each of them, by attempting to cover the entire reachable IPv4 address space geolocated in said predetermined geographical area with the queries' destination addresses.
II. Including in the DNS server list identifications of at least part of the DNS servers that responded correctly to said test DNS queries.

In some embodiments, the given one or more hosts pertain to a client organization, and acquiring the DNS server list comprises extracting from one or more authoritative DNS servers of the client organization identities of DNS servers that affect data transfer to said given one or more client organization's hosts.

In some embodiments, acquiring the DNS server list includes employing proxy devices so as to allow the computer system to reach remotely located DNS servers.

In some embodiments, scrutinizing the DNS servers in the DNS server list includes employing proxy devices so as to reach remotely located DNS servers.

In some embodiments, acquiring the DNS server list comprises including in the list DNS servers according to one or more of the following criteria:
   (a) Pertaining to internet Service Providers (ISPs) and/or Mobile Service Providers (MSPs).
   (b) Pertaining to organizations providing services in predefined geographical areas.

(c) Pertaining to given one or more specific organizations.
(d) Passing a reliability test based on DNS queries whose responses are known in advance.
(e) Surpassing a predefined level of assessed usage.

In some embodiments, detecting the incorrect query response comprises a retry process.

In some embodiments, acquiring the expected result list comprises querying trusted DNS servers.

In some of these embodiments, querying the trusted DNS servers comprises querying authoritative DNS servers.

In a typical embodiment, each DNS query refers to one of the following DNS records: A, AAAA, MX, CNAME, NS, SRV, and TXT.

In some embodiments, repeatedly sending the queries comprise employing one or more of the following scheduling schemes: a random schedule, a pseudorandom schedule, a query dependent schedule, a priority based schedule and an Artificial Intelligence (AI) based schedule.

In some embodiments, employing the priority based schedule comprises prioritizing the DNS servers according to one or more of the following properties thereof:
(a) Pertaining to internet Service Providers (ISPs) and/or Mobile Service Providers (MSPs).
Pertaining to organizations providing services in predefined geographical areas.
(c) Pertaining to given one or more specific organizations.
(d) Passing a reliability test based on DNS queries whose responses are known in advance.
(e) Surpassing a predefined level of assessed usage.

In some embodiments, the above method further comprises prioritizing the issued alerts based on applying one or more of the following prioritizing criteria with relation to the incorrectly responding DNS server:
(a) Relative rate of usage of the incorrectly responding DNS server by users of the given one or more hosts,
(b) Geographical location of the incorrectly responding DNS server,
(c) Type and/or identity of the organization to which the incorrectly responding DNS server pertains.
(d) The properties of the response obtained from the incorrectly responding DNS server.

In accordance with an embodiment of the present invention, there is also provided a computer system adapted to perform the above method.

BRIEF DESCRIPTION OF THE DRAWINGS

The present invention will be more fully understood from the following detailed description of the embodiments thereof, taken together with the drawings in which.

DETAILED DESCRIPTION OF EMBODIMENTS

Embodiments of the present invention provide methods and systems for detecting and alerting on risk of tampering with internet data associated with one or more given hosts, either physical or virtual. The tampering discussed herein is typically performed by malicious parties and comprises affecting DNS records returned from DNS servers as explained in the following. However, the disclosed techniques are also applicable to other causes of incorrect DNS records besides tampering, such as technical and human faults.

Figure 1:
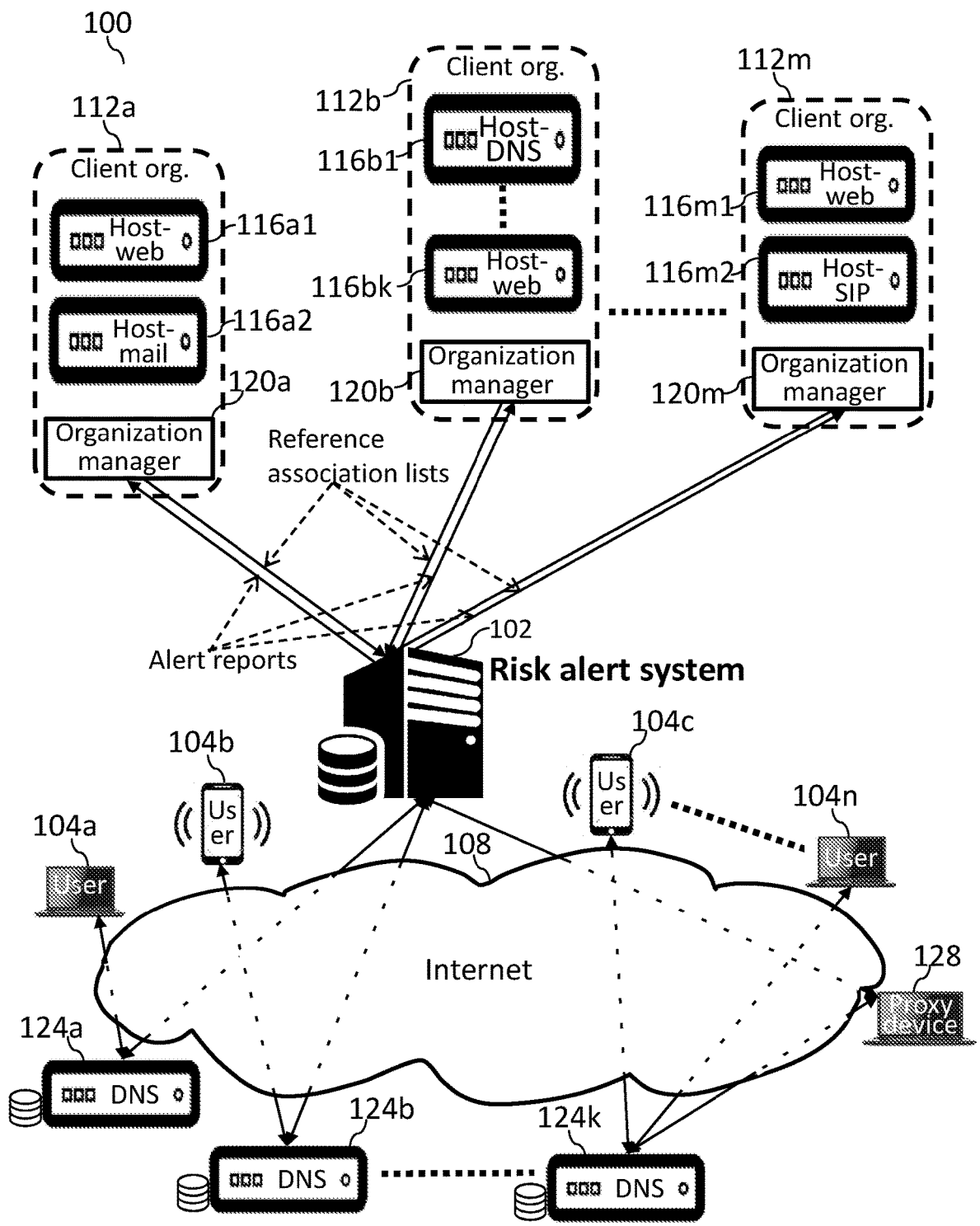
FIG. 1 is a block diagram that schematically illustrates a communication environment comprising a risk alert system that implements the disclosed method for detecting and alerting on risk of DNS related tampering with internet data transfer, in accordance with an embodiment of the present invention.

Referring to FIG. 1, there is shown a communication environment 100 comprising a risk alert system 102 that implements the disclosed techniques, in accordance with an embodiment of the present invention. System 102 comprises system, optionally distributed and/or at least partly cloud-resident, whose operation is explained in detail with reference to FIG. 2 hereinafter. Environment 100 further comprises a plurality of user devices denoted as 104a, 104b, 104c . . . 104n, n being any whole number. Example user devices may be, but are not limited to a mobile smartphone, desktop, laptop, server and smart home appliance. User devices 104a-to-104n normally communicate through the internet, indicated by reference numeral 108, with host computers (hereinafter "hosts") that pertain to client organizations 112a, 112b, . . . 112m, m being any whole number. Organizations 112a-to-112m are denoted "client organizations" since they receive from system 102 the service of alerting on incorrect DNS records over the internet that may affect data transfer associated therewith.

As shown in FIG. 1, each client organization typically comprises one or more hosts and a system manager. For instance, client organization 112a comprises hosts 116a1 and 116a2 and system manager 120a. Host 116a1 is a web server denoted as Host-web, whose conventional DNS-related name would be www.example.com, given client 112a has the domain name example.com. Host 116a2 is a mail server denoted as Host-mail, whose conventional DNS-related name would be e.g. mail.example.com. In the same way, client organization 112b comprises hosts 116b1-to-116bk and system manager 120b, and client organization 112m comprises hosts 116m1 and 116m2 and system manager 120m. The latter two client organizations comprise other host types such as 116b1 DNS server and 116m2 voice/video over IP Session Initiation Protocol (SIP) server. However, the disclosed techniques are not limited to the above host types.

System managers 120a, 120b . . . 120m represent management entities realized by either dedicated software programs, human administrative activity or a combination thereof. They exchange information with system 102 concerning security threats to user devices 124a-to-k and to hosts pertaining to client organizations 112a-to-m. The exchanged information relates to DNS servers 124a, 124b, . . . 124k, k being any whole number. This information and its relation to DNS servers 124a-to-k is described in detail with reference to FIG. 2 in the following. Proxy device 128 represents in FIG. 1 a plurality of proxies, typically servers, which receive internet service from internet service providers (ISPs) in locations where system 102 cannot directly access DNS servers 124a-to-k over the internet.

The above description has focused on the specific elements of communication environment 100 that are essential for understanding certain features of the disclosed techniques. Conventional elements and connectivity that are not needed for this understanding have been omitted from FIG. 1 for the sake of simplicity, but will be apparent to persons of ordinary skill in the art. The environment configuration shown in FIG. 1 is an example configuration, which was chosen purely for the sake of conceptual clarity. In alternative embodiments, any other suitable configurations can also be used. As an example, in some embodiments, a managing entity such as 120*a*-to-*m* may obtain the aforementioned services from risk alert system 102 with regard to one or more hosts such as 116*a*1-to-116*m*2 without pertaining to the organization, or organizations, thereof. An example of such managing entity may be some governmental authority.

Figure 2:
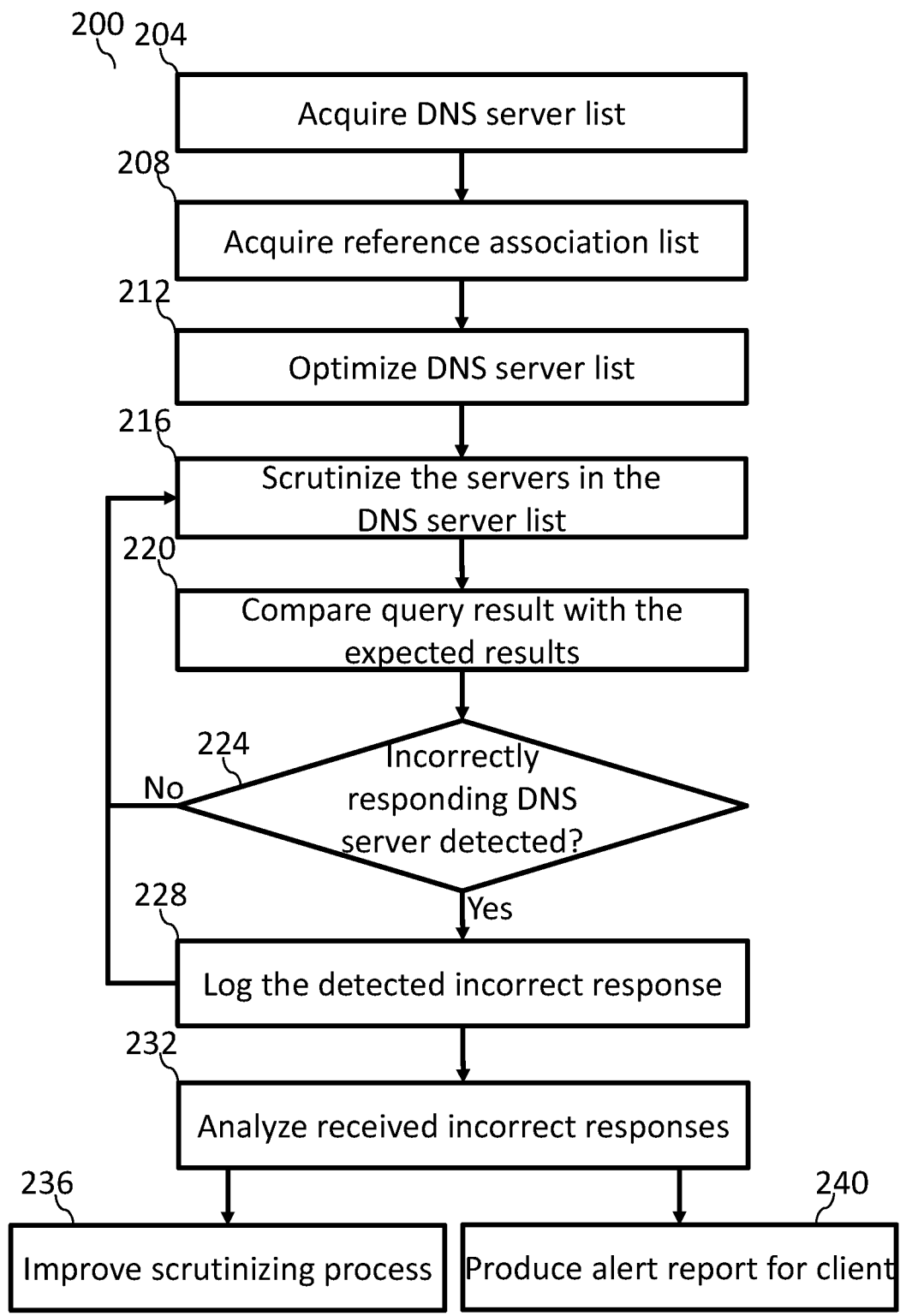
FIG. 2 is a flowchart that schematically illustrates a method for detecting and alerting on risk of DNS related tampering with internet data transfer, in accordance with an embodiment of the present invention.

Referring now to FIG. 2, there is shown a flowchart 200 which schematically illustrates a method, mainly implemented in risk alert system 102 and system managers 120*a*-to-*m*, for detecting and alerting on risk of DNS related tampering with data transfer over the internet between user devices 104*a*-to-n and the aforementioned hosts pertaining to client organizations 112*a*-to-*m*, in accordance with an embodiment of the present invention. The method is typically implemented by a software program running on system 102, however some of its steps may be aided by administrative activity as may be apparent from the following explanations.

Flowchart 200 begins with an acquiring step 204, in which system 102 attempts to acquire a "DNS server list" comprising identifications of as many deemed reliable DNS servers as possible over the internet that may affect data transfer of users 104*a*-to-*n* related to client systems 112*a*-to-*m*. In embodiments of the present invention, system 102 acquires the DNS server list by applying either one or an applicable combination of the following means and inclusion criteria:
  a) Obtaining the list from a third party.
  b) Conducting reliability tests on a list of DNS servers such as mentioned in a), based on test DNS queries whose responses are known in advance.
  c) Conducting the reliability tests of b) above on virtually all the DNS servers over the internet by covering the entire reachable IPV4 address space with the test queries' destination addresses. This process may also include private addresses that may be allocated by ISPs to their clients.
  d) Employing conventional in the art search techniques.
  e) Including DNS servers pertaining to organizations that provide internet access, fixed and mobile, to internet users.
  f) Including DNS servers pertaining to organizations providing internet access service in predefined geographical areas.
  g) Including DNS servers of well-known organizations, whose DNS servers are commonly deemed trusted.
  h) Including DNS servers based on the criterion of surpassing a predefined level of assessed usage. The usage level may be assessed using techniques known in the art. An example technique comprises setting up an authoritative DNS server for a given domain name, and causing large numbers of users over the internet to query for DNS records for which the server is authoritative. This will result in users querying their DNS servers for said records, and the users' DNS servers contacting the authoritative DNS server, leaving a trace in its logs. Such queries can be triggered, for example, by including said DNS records in an internet ad viewed by a large number of users, causing their browser to resolve them. Reviewing the authoritative DNS server's logs would then reveal the relative popularity of DNS servers whose users saw the ad. Cache-busting techniques can be used to make sure that the users' queries aren't cached to make the measurement more accurate.
  Another example technique comprises querying all the servers in a list for cached only copies of various popular DNS records, such as A/AAAA records for popular websites and other commonly used servers mail and like time synchronization servers. Over time, statistics of presence or absence of those cached only records from responding servers would yield their relative usage by their client users.
  i) Extracting from logs of one or more authoritative DNS servers of a client organization, e.g. one of 112*a*-to-*m*, identities of DNS servers that affect data transfer to hosts pertaining to that client organization. Such DNS servers affect that data transfer by responding to users or any other hosts that request with to communicate the above organization's hosts. The identities of those DNS servers are typically logged at the above authoritative DNS servers when those DNS servers are querying the authoritative DNS servers.

In typical embodiments system 102 keeps updating the DNS server list by occasionally applying either one or an applicable combination of the above means. The aforementioned term "identifications" typically relates to the IP address and/or the name of the relevant DNS servers.

Next, in an acquiring step 208, system 102 acquires a "reference association list". This list typically relates to one or more hosts pertaining to at least one client organization whose owner, or operator, requests a detection and alert service, such as explained above, from system 102. A typical reference association list comprises an association between:
  a) A query list comprising, per each of the above client hosts, one or more DNS queries for corresponding DNS records, wherein such records are characterized by being related to said each of the above client hosts. Example DNS record types that may be included in the query list are provided in the table below.
  b) One or more expected query responses per each query in the query list.

Normally, acquiring a reference association list involves some administrative activity that involves the client organization owner, or operator, and the operator of system 102. It should be noted that in a typical embodiment, system 102 is adapted to process a plurality of reference association lists according to this and the following method steps description. The above expected results may be provided to system 102 by system managers 120*a*-to-*m*. In some embodiments system 102 acquires at least part of the expected query responses by querying commonly deemed trusted DNS servers. Such trusted servers may pertain to some well-known organizations, or may be relevant authoritative DNS servers. For reaching the authoritative DNS servers of e.g. www.example.com, system 102 first queries the DNS root about com's DNS server IP address and then queries com's DNS server about example.com's DNS server address. In some embodiments, the order of steps 204 and 208 may be interchanged, The following table provides example DNS record types that may be included in the above query list and are prone to be tampered with in order to maliciously affect data transfer over the internet that may be associated with the hosts and users of client organizations 112*a*-to-*m*. For each record type, the table shows an example expected query response of a user query and an example adverse outcome that would result if an attacker tampers with the queried record thereby causing a falsified/incorrect query response to be returned instead of the expected one. In the table, the domain "example.com" refers to the domain name of an example client organization, i.e. one of the systems 112*a*-to-*m*. The attacker's actions and their consequences are provided in bold letters.

| DNS record Type | Normal Operation | Tampered with operation |
|---|---|---|
| A | A user wants to visit www.example.com. The user queries for an A record, and is responded by the valid A record pointing at 10.1.1.1, which is the IP address of www.example.com, which the user then visits. | An attacker falsifies the A record for www.example.com A user wants to visit www.example.com. The user queries for an A record, and is responded by the falsified A record pointing at 10.6.6.6, which the user then visits without knowing that this is an attacker-controlled IP address. |
| AAAA | A user wants to visit www.example.com. The user queries for an AAAA record, and is responded by the valid AAAA record pointing at fe80::1111, which is the IP address of www.example.com, which the user then visits. | An attacker falsifies the AAAA record for www.example.com A user wants to visit www.example.com. The user queries for an AAAA record, and is responded by the falsified AAAA record pointing at fe80::6666, which the user then visits without knowing that this is an attacker-controlled IP address. |
| MX | A user wants to send an email to bob@example.com The user looks up example.com's mail server mail.example.com by querying for the MX record for example.com, and is responded by an MX record indicating that example.com's mail server is the valid mail.example.com. Using an A query, the user learns that the address of mail.example.com is 10.1.1.2, and sends the email there. | An attacker falsifies the MX record for example.com A user wants to send an email to bob@example.com The user looks up example.com's mail server mail.example.com by querying for the MX record for example.com, and is responded by the falsified MX record indicating that example.com's mail server is the invalid mail.evil.invalid. Using an A query, the user learns that the address of mail.evil. invalid is an attacker-controlled mail server address 10.6.6.7, and sends the email there. |
| CNAME | A user wants to visit www.example.com. The user queries for an A record for www.example.com, and is responded by the valid CNAME host.example.com The user then queries for an A record for host.example.com and is responded with the IP address 10.1.1.1, which the user then visits. | An attacker falsifies the CNAME record for www.example.com A user wants to visit www.example.com. The user queries for an A record for www.example.com, and is responded by the falsified CNAME host-evil.evil.invalid The user then queries for an A record for host-evil. evil. invalid and is responded with the attacker's IP address 10.6.6.6, which the user then visits without knowing that this is an attacker-controlled host IP address. |
| NS | A user wants to visit www.example.com. The user asks its DNS server for the IP address of www.example.com. The server doesn't have www.example.com in its cache so it performs an iterative search to find the authoritative DNS server for example.com. The DNS server queries the root server a.root-servers.net., and receives a valid NS record for a.com server- a.gtld-servers.net. The DNS server queries a.gtld-servers.net, and receives a valid NS record for example.com- | An attacker falsifies the NS record for example.com A user asks its DNS server for the IP address of www.example.com. The server doesn't have www.example.com in its cache so it performs an iterative search to find the authoritative DNS server for example.com. The DNS server queries the root server a.root-servers.net., and receives a valid NS record for a.com server- a.gtld-servers.net. The DNS server queries a.gtld-servers.net, and receives the falsified NS record for example.com host-dns.evil.invalid. The DNS server queries |

| DNS record Type | Normal Operation | Tampered with operation |
| --- | --- | --- |
| | host-dns.example.com. The DNS server queries host-dns.example.com, and receives an A record with the IP address 10.1.1.1, which it returns to the querying user and stores in its cache. The user then visits 10.1.1.1. | host-dns. evil. invalid, and receives a falsified A record with an attacker-controlled IP address 10.6.6.6, which it returns to the querying user and stores in its cache. The user then visits the attacker-controlled 10.6.6.6. |
| SRV | A user wants to make a Voice-over-IP (VOIP) call to bob@example.com using the SIP protocol. To find Bob's SIP server, the user queries for the SRV record _sip._tcp.example.com and is responded with sip.example.com, the name of example.com's SIP server. The user performs an A query for sip. example.com, and is responded with the address 10.1.1.3. The user then initiates a VOIP call to that address. | An attacker falsifies the SRV record for example.com A user wants to make a Voice-over-IP (VOIP) call to bob@example.com using the SIP protocol. To find Bob's SIP server, the user queries for the SRV record _sip._tcp.example.com and is responded with sip.evil.invalid, a falsified name of example.com's SIP server. The user performs an A query for sip. evil. invalid, and is responded with an attacker-controlled address 10.6.6.8. The user then initiates a SIP call to that false address. |
| TXT | A user with the email address user@example.net sends an email to another user bob@example.com. To ensure authenticity, the email is signed using example.net's DomainKeys Identified Mail (DKIM) private key. Upon receiving the email, example.com's email server mail.example.com wants to verify the email's authenticity. It therefore queries for example.net's DKIM TXT record and is responded with example.net's DKIM public key. mail.example.com then uses the public key to verify the signature on the email, concluding that the email is authentic. | An attacker changes example.net's DKIM TXT record, and puts its own public key in its place. The attacker then forges an email to bob@example.com, making it appear as if it came from user@example.net. The email is signed using the attacker's DKIM private key. Upon receiving the email, example.com's email server mail.example.com wants to verify the email's authenticity. It therefore queries for example.net's DKIM TXT record and is responded with the attacker's DKIM public key. mail.example.com then uses the public key to verify the signature on the email, wrongly concluding that the attacker's email is the authentic one. |

Flowchart 200 proceeds to an optional optimization step 212, which comprises creating a reduced instance of the DNS server list by directing it to the specific hosts included in a given reference association list. An apparent reduction criterion may be including only the DNS servers that are expected to serve users of the hosts included in the given reference association list. Such user distinction is achieved in some embodiments based e.g. on the users' geolocation and/or organizational affiliation.

In a scrutinizing step 216, system 102 scrutinizes the servers in the DNS server list by repeatedly sending to each of them each of the queries included in the query list. In typical embodiments, repeating the queries may involve various scheduling schemes and combinations thereof including but not limited to the following:

a random schedule, a pseudorandom schedule, a query dependent schedule e.g. higher frequency of queries related to more sensitive hosts, higher frequency of queries related to DNS servers that affect more users of a specific client organization, a priority based schedule e.g. higher frequency of queries related to more frequently accessed hosts, and Artificial Intelligence (AI) including machine-learning based schedules.

In some embodiments, employing priority based schedule comprises prioritizing the DNS servers according to one or more of the following properties thereof:
  (a) Pertaining to internet Service Providers (ISPs) and/or Mobile Service Providers (MSPs).
  (b) Pertaining to organizations providing services in pre-defined geographical areas.
  (c) Pertaining to given one or more specific organizations.
  (d) Passing a reliability test based on DNS queries whose responses are known in advance.
  (e) Surpassing a predefined level of assessed usage. Example usage assessment methods are given above.

Next, in a comparing step 220, the software program in system 102 compares each query response obtained while scrutinizing the DNS servers with its expected query response included in the reference association list so as to detect incorrectly responding DNS servers. As long as no incorrect response is detected, flowchart 200 keeps returning through a decision step 224 to scrutinizing step 216, which keeps running. Once an incorrect response is detected, system 102 logs its details in a logging step 228. Flowchart 200 then returns to scrutinizing step 216 and also proceeds to an analysis step 232. In this analysis the software program in system 102 tries to find out trends and possible common denominators between the detected incorrect responses. The outcome of this analysis is an alert report produced in step 240 for delivery to one of the system managers 120*a*-to-*m*. In some embodiments the system manager is alerted immediately upon each anomaly detection. The analysis of step 232 also serves to improve step 216 scrutinizing scheduling in step 236. In typical embodiments, proxy devices such as the aforementioned 128, are used for querying DNS servers in step 204 as well as in step 216. In some embodiments, in these steps detecting an incorrect query response comprises a retry process, i.e. it is bases on more than a single incorrect response.

Back to step 232, its purpose is to prioritize the faults detected in step 220 so as to produces effective alert reports in step 240 as well as helpful improvements in step 236. One or more of the following prioritizing criteria are employed in various embodiments of the present invention:

(f) Relative rate of usage of the incorrectly responding DNS server by the client organization's users and hosts.

(g) Geographical location of the incorrectly responding DNS server. For example, priority may be higher when the incorrectly responding DNS server is located in a region where sensitive activity of users may take place.

(h) Type and/or identity of the organization to which the incorrectly responding DNS server pertains, e.g.: ISP in some country, government, commercial competitor of the client.

(i) The properties of the response obtained from the incorrectly responding DNS server. For example, an alert on incorrect IP address that pertains to the client's network may be considered less prioritized.

The disclosed method typically comprises an obvious complementing step, which is attempting to pinpoint the cause of a detected fault and preferably also to mitigate it. This step is not shown in flowchart 200 since it mostly involves administrative rather than technical activity. This activity may include complaining to the owner of the faulty DNS server, trying to identify any malicious party that might be responsible for the detected fault possibly based on the incorrect response properties, etc.

Flowchart 200 is an example flowchart, which was chosen purely for the sake of conceptual clarity. In alternative embodiments, any other suitable flowchart can also be used for illustrating the disclosed method. Method steps that are not mandatory for understanding the disclosed techniques were omitted from FIG. 2 for the sake of simplicity.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method performed by a computer system for alerting on incorrect DNS records returned by DNS servers over the internet and related to data transfer associated with given one or more hosts, the method comprising the steps of:
   I. acquiring a reference association list comprising an association between:
      (a) a query list comprising, per each of the given one or more hosts, one or more DNS queries for corresponding DNS records related to said data transfer, and
      (b) one or more expected query responses per each query in the query list;
   II. acquiring a DNS server list comprising identifications of as many deemed reliable DNS servers as possible over the internet that may affect said data transfer;
   III. scrutinizing the DNS servers in the DNS server list by repeatedly sending to each of them each of the queries included in the query list;
   IV. comparing each query response obtained while scrutinizing the DNS servers with its expected query response included in the reference association list so as to detect incorrectly responding DNS servers; and
   V. issuing an alert upon detecting an incorrectly responding DNS server, the alert comprising the identification of the incorrectly responding DNS server and information about the incorrect query response thereof,
   wherein acquiring the DNS server list comprises the further steps of:
   VI. attempting to address as many as possible DNS servers over the internet with one or more test DNS queries sent to each of them, by covering the entire reachable IPV4 address space with the queries' destination addresses; and
   VII. including in the DNS server list identifications of at least part of the DNS servers that responded correctly to said test DNS queries, and
   wherein acquiring the DNS server list includes employing proxy devices so as to allow the computer system to reach remotely located DNS servers.

2. A method performed by a computer system for alerting on incorrect DNS records returned by DNS servers over the internet and related to data transfer associated with given one or more hosts, the method comprising the steps of:
   I. acquiring a reference association list comprising an association between:
      (a) a query list comprising, per each of the given one or more hosts, one or more DNS queries for corresponding DNS records related to said data transfer, and
      (b) one or more expected query responses per each query in the query list;
   II. acquiring a DNS server list comprising identifications of as many deemed reliable DNS servers as possible over the internet that may affect said data transfer;
   III. scrutinizing the DNS servers in the DNS server list by repeatedly sending to each of them each of the queries included in the query list;
   IV. comparing each query response obtained while scrutinizing the DNS servers with its expected query response included in the reference association list so as to detect incorrectly responding DNS servers; and
   V. issuing an alert upon detecting an incorrectly responding DNS server, the alert comprising the identification of the incorrectly responding DNS server and information about the incorrect query response thereof,
   wherein acquiring the DNS server list comprises the further steps of:

VI. attempting to address as many as possible DNS servers over the internet with one or more test DNS queries sent to each of them, by covering the entire reachable IPV4 address space with the queries' destination addresses; and VII. including in the DNS server list identifications of at least part of the DNS servers that responded correctly to said test DNS queries, and wherein scrutinizing the DNS servers in the DNS server list includes employing proxy devices so as to reach remotely located DNS servers.

3. A method performed by a computer system for alerting on incorrect DNS records returned by DNS servers over the internet and related to data transfer associated with given one or more hosts, the method comprising the steps of:

I. acquiring a reference association list comprising an association between:
  (a) a query list comprising, per each of the given one or more hosts, one or more DNS queries for corresponding DNS records related to said data transfer, and
  (b) one or more expected query responses per each query in the query list;

II. acquiring a DNS server list comprising identifications of as many deemed reliable DNS servers as possible over the internet that may affect said data transfer;

III. scrutinizing the DNS servers in the DNS server list by repeatedly sending to each of them each of the queries included in the query list;

IV. comparing each query response obtained while scrutinizing the DNS servers with its expected query response included in the reference association list so as to detect incorrectly responding DNS servers; and V. issuing an alert upon detecting an incorrectly responding DNS server, the alert comprising the identification of the incorrectly responding DNS server and information about the incorrect query response thereof, wherein acquiring the DNS server list comprises including in the list DNS servers according to one or more of the following criteria:
  (a) pertaining to internet Service Providers (ISPs) and/or Mobile Service Providers (MSPs),
  (b) pertaining to organizations providing services in predefined geographical areas,
  (c) pertaining to given one or more specific organizations,
  (d) passing a reliability test based on DNS queries whose responses are known in advance, and
  (e) surpassing a predefined level of assessed usage.

4. A method performed by a computer system for alerting on incorrect DNS records returned by DNS servers over the internet and related to data transfer associated with given one or more hosts, the method comprising the steps of:

I. acquiring a reference association list comprising an association between:
  (a) a query list comprising, per each of the given one or more hosts, one or more DNS queries for corresponding DNS records related to said data transfer, and
  (b) one or more expected query responses per each query in the query list;

II. acquiring a DNS server list comprising identifications of as many deemed reliable DNS servers as possible over the internet that may affect said data transfer;

III. scrutinizing the DNS servers in the DNS server list by repeatedly sending to each of them each of the queries included in the query list;

IV. comparing each query response obtained while scrutinizing the DNS servers with its expected query response included in the reference association list so as to detect incorrectly responding DNS servers; and V. issuing an alert upon detecting an incorrectly responding DNS server, the alert comprising the identification of the incorrectly responding DNS server and information about the incorrect query response thereof, wherein detecting the incorrect query response comprises a retry process.

5. A method performed by a computer system for alerting on incorrect DNS records returned by DNS servers over the internet and related to data transfer associated with given one or more hosts, the method comprising the steps of:

I. acquiring a reference association list comprising an association between:
  (a) a query list comprising, per each of the given one or more hosts, one or more DNS queries for corresponding DNS records related to said data transfer, and
  (b) one or more expected query responses per each query in the query list;

II. acquiring a DNS server list comprising identifications of as many deemed reliable DNS servers as possible over the internet that may affect said data transfer;

III. scrutinizing the DNS servers in the DNS server list by repeatedly sending to each of them each of the queries included in the query list;

IV. comparing each query response obtained while scrutinizing the DNS servers with its expected query response included in the reference association list so as to detect incorrectly responding DNS servers; and V. issuing an alert upon detecting an incorrectly responding DNS server, the alert comprising the identification of the incorrectly responding DNS server and information about the incorrect query response thereof, wherein repeatedly sending the queries comprises employing one or more of the following scheduling schemes: a random schedule, a pseudorandom schedule, a query dependent schedule, a priority-based schedule and an Artificial Intelligence (AI) based schedule, and wherein employing the priority-based schedule comprises prioritizing the DNS servers according to one or more of the following properties thereof:
  (a) pertaining to internet Service Providers (ISPs) and/or Mobile Service Providers (MSPs),
  (b) pertaining to organizations providing services in predefined geographical areas,
  (c) pertaining to given one or more specific organizations,
  (d) passing a reliability test based on DNS queries whose responses are known in advance, and
  (e) surpassing a predefined level of assessed usage.

6. A method performed by a computer system for alerting on incorrect DNS records returned by DNS servers over the internet and related to data transfer associated with given one or more hosts, the method comprising the steps of:

I. acquiring a reference association list comprising an association between:
  (a) a query list comprising, per each of the given one or more hosts, one or more DNS queries for corresponding DNS records related to said data transfer, and
  (b) one or more expected query responses per each query in the query list;

II. acquiring a DNS server list comprising identifications of as many deemed reliable DNS servers as possible over the internet that may affect said data transfer;

III. scrutinizing the DNS servers in the DNS server list by repeatedly sending to each of them each of the queries included in the query list;

IV. comparing each query response obtained while scrutinizing the DNS servers with its expected query response included in the reference association list so as to detect incorrectly responding DNS servers; and
V. issuing an alert upon detecting an incorrectly responding DNS server, the alert comprising the identification of the incorrectly responding DNS server and information about the incorrect query response thereof, while prioritizing the issued alerts based on applying one or more of the following prioritizing criteria with relation to the incorrectly responding DNS server:
(a) relative rate of usage of the incorrectly responding DNS server by users of the given one or more hosts,
(b) geographical location of the incorrectly responding DNS server,
(c) type and/or identity of the organization to which the incorrectly responding DNS server pertains, and
(d) the properties of the response obtained from the incorrectly responding DNS server.

* * * * *